(12) United States Patent
Schalk

(10) Patent No.: US 9,099,000 B2
(45) Date of Patent: Aug. 4, 2015

(54) VEHICLE TELEMATICS COMMUNICATION FOR PROVIDING MOBILE DEVICE ALERTS

(75) Inventor: Nicole L. Schalk, Rochester Hills, MI (US)

(73) Assignee: General Motors LLC, Detroit, MI (US)

(*) Notice: Subject to any disclaimer, the term of this patent is extended or adjusted under 35 U.S.C. 154(b) by 244 days.

(21) Appl. No.: 13/444,543

(22) Filed: Apr. 11, 2012

(65) Prior Publication Data

US 2013/0271275 A1 Oct. 17, 2013

(51) Int. Cl.
*B60Q 1/00* (2006.01)
*G08G 1/0962* (2006.01)
*H04W 4/02* (2009.01)
*G06F 3/01* (2006.01)
*H04M 1/00* (2006.01)
*H04M 1/725* (2006.01)
*G08G 1/00* (2006.01)
*H04W 4/04* (2009.01)
*H04L 29/08* (2006.01)

(52) U.S. Cl.
CPC ............... *G08G 1/0962* (2013.01); *G06F 3/01* (2013.01); *H04M 1/00* (2013.01); *H04M 1/72538* (2013.01); *H04W 4/023* (2013.01); *G08G 1/202* (2013.01); *G08G 1/205* (2013.01); *H04L 67/12* (2013.01); *H04W 4/046* (2013.01)

(58) Field of Classification Search
CPC ....... B60Q 1/00; G08G 1/0962; G08G 1/202; G08G 1/205; H04W 4/023; H04W 4/046; G06F 3/01; H04M 1/00; H04M 1/72538; H04L 67/12
USPC ...................... 340/438, 539.1, 539.11; 701/2; 307/10.1, 10.4, 10.6
See application file for complete search history.

(56) References Cited

U.S. PATENT DOCUMENTS

| 7,859,129 B2* | 12/2010 | Ozawa et al. ................ 307/10.2 |
| 8,548,645 B2* | 10/2013 | Long ................................. 701/2 |
| 2005/0285445 A1* | 12/2005 | Wruck et al. ............... 307/10.1 |
| 2008/0065290 A1* | 3/2008 | Breed et al. .................... 701/29 |

* cited by examiner

*Primary Examiner* — Daryl Pope
(74) *Attorney, Agent, or Firm* — Anthony Luke Simon; Reising Ethington P.C.

(57) ABSTRACT

A method of providing a mobile device alert to a vehicle operator, where the method may provide an alert in the event that a mobile phone or other such device is not detected. In an exemplary embodiment, the method detects operation of a vehicle, such as when the ignition is started. Then, the method attempts detection of a mobile phone or other such wireless device associated with an operator of the vehicle. If the method determines that the attempted detection failed, then an alert is presented within the vehicle to help prevent the vehicle operator from leaving in the vehicle without his or her mobile device.

18 Claims, 3 Drawing Sheets

VEHICLE TELEMATICS COMMUNICATION FOR PROVIDING MOBILE DEVICE ALERTS

TECHNICAL FIELD

The present invention relates generally to vehicle telematics systems and to services provided to mobile device owners via a vehicle telematics unit.

BACKGROUND OF THE INVENTION

Vehicle operators are increasingly using mobile cellular phones and/or other mobile devices that are carried with them while the operators are present inside their vehicles. However, a vehicle operator may start a new vehicle trip while unintentionally leaving his of her mobile device behind, and may not notice that the mobile device is not present inside the vehicle until the vehicle is at a distance from the vehicle departure location. And, while automatic detection of mobile phones and other wirelessly-communication mobile devices is known, the systems using such detection are typically used to provide a vehicle or mobile device service to the user only after successful detection of the device in the vehicle.

SUMMARY OF THE INVENTION

According to one embodiment of the invention, there is presented a method of providing a mobile device alert in a vehicle, comprising the steps of: (a) detecting operation of a vehicle; (b) attempting detection of a mobile device associated with an operator of the vehicle in response to the detection in step (a); (c) determining that the attempted detection of the mobile device failed; and (d) in response to the determination in step (c), presenting an alert within the vehicle that the mobile device was not detected.

According to another embodiment of the invention, there is presented a method of providing a mobile device alert in a vehicle, comprising the steps of: (a) providing a graphical user interface that provides a user-selectable option to initiate an alert service for a mobile device held by the user; (b) receiving an indication that a user has selected the option; (c) establishing an alert trigger associated with the mobile device; and (d) configuring a vehicle with the alert trigger.

According to another embodiment of the invention, there is presented a telematics unit for a vehicle for providing a mobile device alert in a vehicle, wherein the vehicle telematics unit includes a processor and computer readable memory that contains instructions that are executed by the processor to carry out the following steps: (a) detecting operation of a vehicle; (b) attempting detection of a mobile device associated with an operator of the vehicle in response to the detection in step (a); (c) determining that the attempted detection of the mobile device failed; and (d) in response to the determination in step (c), presenting an alert within the vehicle that the mobile device was not detected.

According to yet another embodiment of the invention, there is presented a telematics unit for a vehicle for providing a mobile device alert in a vehicle, wherein the vehicle telematics unit includes a processor and computer readable memory that contains instructions that are executed by the processor to carry out the following steps: (a) detecting operation of a vehicle; (b) attempting detection of a mobile device associated with an operator of the vehicle in response to the detection in step (a); (c) when determining that the attempted detection succeeded, presenting an alert within the vehicle that the mobile device was detected; and (d) when determining that the attempted detection failed, presenting an alert within the vehicle that the mobile device was not detected.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The method described below provides a mobile device alert to a vehicle operator, where the method may perform one of several alerts in the event that a mobile device is not detected. In doing so, this method may be used to help prevent an operator from inadvertently forgetting his or her mobile device when departing in the vehicle from home, place of business, or any other location.

Communications System—

Figure 1:
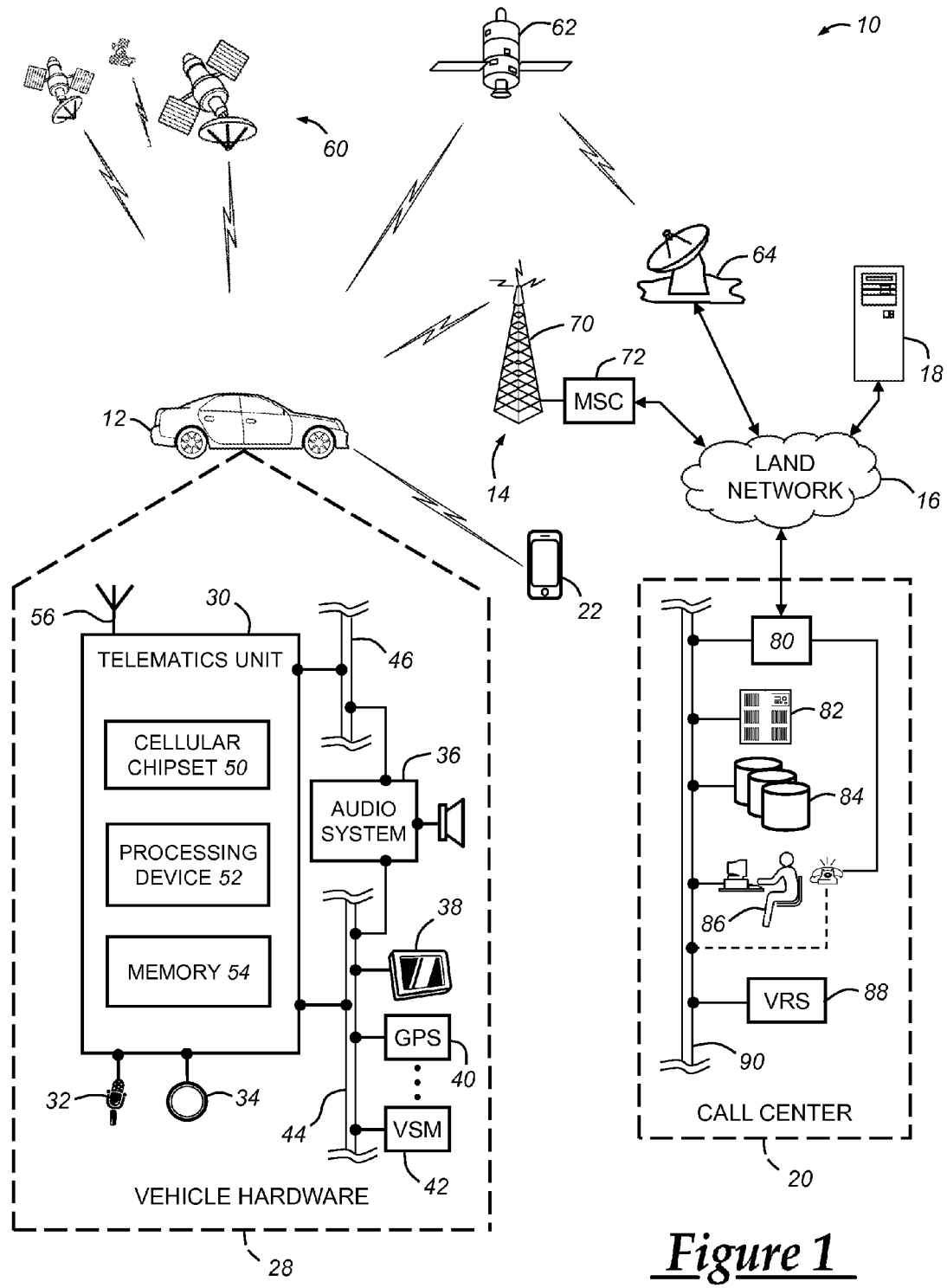
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth™.

When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In addition, mobile device 22 can be equipped with one or more accelerometers (e.g., single-axis, multi-axis, etc.) and/or other sensors that measure the acceleration, vibration, shock, and falling of the mobile device. The accelerometer used may be piezoelectric, piezoresistive, capacitive, micro electro-mechanical systems (MEMS), or any other suitable accelerometer. Skilled artisans will recognize that other device than accelerometer that can determine acceleration, vibration, shock, or falling of a device may be used. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services. Apart from any cellular or other telephone services, mobile device 22 can employ one of a variety of short range wireless communication technologies such as Bluetooth™. Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
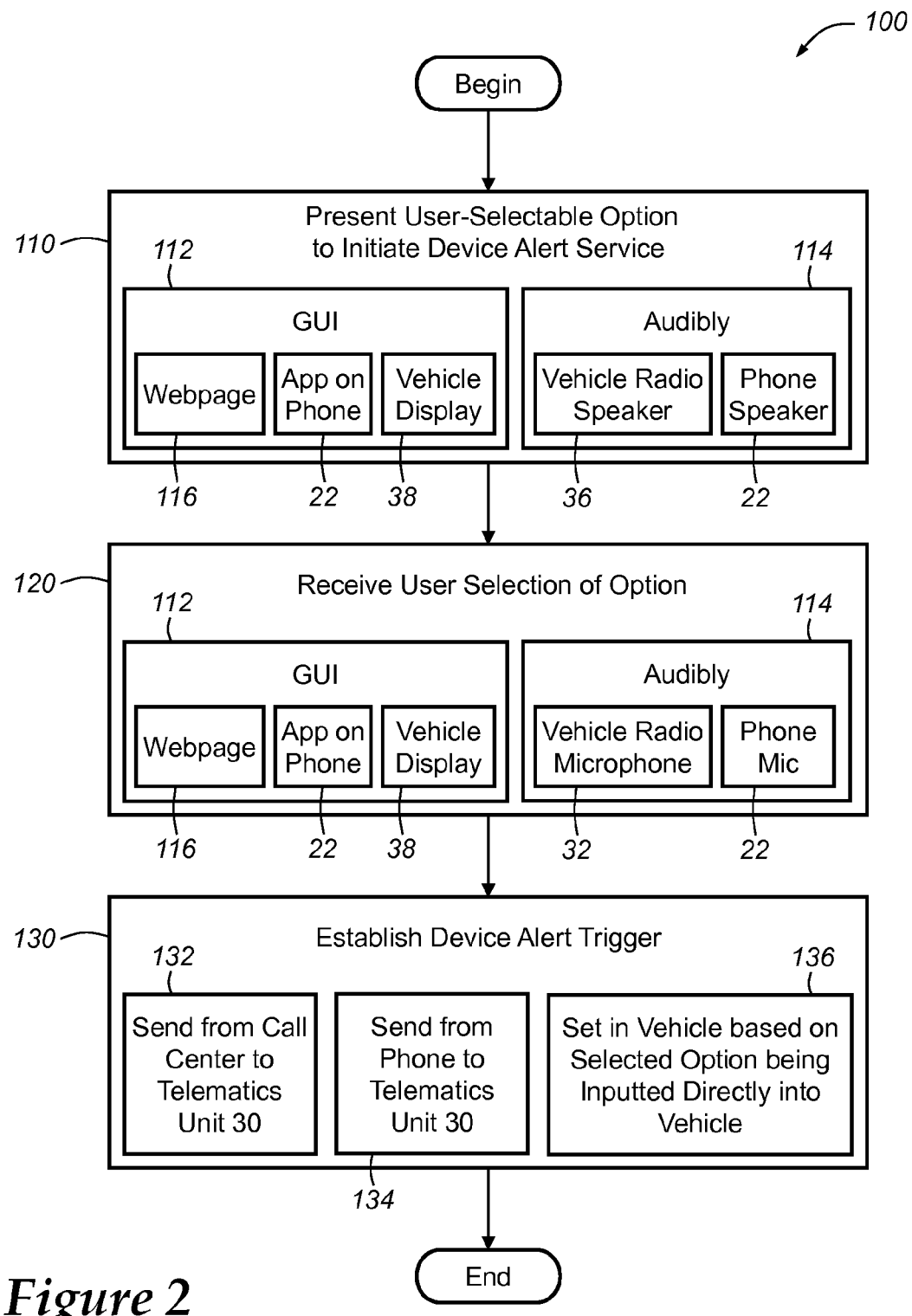
FIG. 2 is a flowchart of an exemplary embodiment of a method for configuring a vehicle with a mobile device alert.

Turning now to FIG. 2, there is shown a method 100 for configuring a vehicle with a mobile device alert. This method is merely illustrative of one embodiment and many others will become apparent to those skilled in the art. The method starts at step 110 and begins by presenting a user-selectable option to initiate the device alert service. FIG. 2 shows two different general approaches for presenting this option: a GUI (graphical user interface) option 112 and an audible option 114, either of which will initiate configuring of the vehicle with a mobile device alert. GUI 112 may be implemented in any of a number of different ways; for example, using a webpage 116, application on phone 22, or vehicle display 38. Webpage 116 can be, for example, a webpage accessible via a telematics service subscriber login via computer 18 or phone 22 that permits a subscriber to access various telematics service options and information concerning a particular vehicle associated with their subscription. Thus, for example, the mobile device alert option may be one of a number of different configurable items made available to the vehicle operator (e.g., the subscriber) via the webpage 116. A radio button or check box are two possible means of providing this option, with the user selection then being sent back to the call center 20 or other facility to carry out the mobile device alert service initiation. The phone 22 app may be software stored on the vehicle operator's mobile phone 22 that can be initiated by the user and that may present a screen display with a button or other user-selectable option to initiate the service. Similarly, vehicle display 38 may present a GUI that presents the mobile device alert option to the user. Any of the audible options 114 may also be implemented in any suitable way, such as by using vehicle audio system 36 or the speaker of phone 22. In some embodiments, only one of these five means of initiating the mobile device alert service maybe provided. In other embodiments, two or more of these five means may be used.

Next at step 120, method 100 receives user selection of the option via one of the five input means described above. For example, in the event webpage 116 is used, the selection of the option may be returned to the call center 20 or other central facility server hosting the webpage (or to some other server), and then automatically associated with the vehicle 12 based on the subscriber's login or other information provided via by the user. In the event the app on phone 22 is used, the selection may be sent from the phone 22 to the vehicle (e.g., to telematics unit 30) via the short range wireless communication, or via cellular or otherwise (and thus directly received by the vehicle without going through the call center 20), or may be sent to the call center from the phone 22 and then processed there and sent to the vehicle as a message or command. Where the phone 22 microphone is used, the speech can be processed on the phone, or via speech file uploaded to a cloud-based speech processing service, or passed from the phone 22 to the vehicle via the short range wireless communication and processed into text by the automated speech recognition (ASR) system on the vehicle. In other embodiments, the vehicle user interface may be used to receive the selection directly from manual operator input to the vehicle; for example, via a touch-sensitive screen on display 38 or via the vehicle microphone 32. Input from the microphone may be processed by the ASR system or, instead of using speech recognition, an operator speech-based selection of the mobile device alert option (whether received via the vehicle or phone microphones) may be received by a live advisor at call center 20 who may then issue a command to be sent to the vehicle to initiate the service. In whatever manner the user selection is provided, it is ultimately received by the vehicle 12.

In response to receiving the user selection of the mobile device alert option, a device alert trigger is set at the vehicle at step 130 so that the vehicle operator will be given a notification (alert) in the event he or she attempts to use the vehicle without his or her phone 22. To do this, (1) the mobile phone 22 is associated with the vehicle 12 so that the alert trigger may be set on the correct vehicle and (2) a mobile device identifier for the phone 22 is provided to the vehicle so that the vehicle will be able to distinguish phone 22 from other mobile devices. The identifier (ID) may comprise alphanumeric or other characters. Examples include the device 22 electronic serial number (ESN), mobile equipment identifier (MEID), international mobile equipment identity (IMEI), mobile identification number (MIN), international mobile subscriber identity (IMSI) device, Bluetooth™ address, Bluetooth™ device name, phone number, phone app serial number, etc.

Where the service is set up in step 130 at the vehicle 12 with the phone 22 connected to the vehicle via, for example, the short range wireless communication, then the association of the phone 22 with the vehicle may be via this connection and, as well, the mobile device identifier may be sent to the vehicle via this connection. In this regard, the mobile device identifier might be broadcasted automatically by the phone and received by the vehicle as part of a device discovery process. Thus, where vehicle then receives the request or command to establish the mobile device alert trigger, it can then use the received mobile device identifier to setup the trigger so that, upon detecting operator arrival at the vehicle (e.g., by an ignition-on event or otherwise), the vehicle knows the identity of the device it seeks to locate. In the event the device is not located automatically by the vehicle, an alert may be provided to the operator, as discussed below. As noted above, the request to establish the alert trigger may be received by the vehicle by having been inputted directly (e.g., via microphone 32 or a touchscreen on display 38), as indicated at step 136, or from the phone 22, as indicated at step 134.

In other embodiments, associating the mobile device with the vehicle may be done in other manners. For example, where the mobile device alert service is selected via webpage 116, several possibilities exist. If access to the webpage is via a subscriber login that associates that subscriber with the unique vehicle 12, and the subscriber supplies their mobile device 22 phone number or other device identifier also via the webpage, then the receiving server will have all of the information necessary to make the association and can then supply the alert service option request to correct vehicle along with the device ID. Thus, the alert trigger may be received at the vehicle via, for example, wireless communication system 14, from the server at the call center 20 or other remote facility, as indicated at step 132.

Once set, the alert trigger monitors for a particular occurrence or set of conditions and, when the trigger occurs, an alert is presented to the operator in the vehicle to note that the device (phone 22) has not been detected in the vehicle. The trigger condition may be any event or combination of events indicative of operation of the vehicle, preferably one or more events that signal operator arrival at the vehicle. These events include, for example, receiving a signal from a key fob associated with vehicle 12, such as door unlock or other vehicle function activation; weight sensing or other driver presence detection built into the driver's seat, steering wheel, pedals, or other cockpit device sensing; detecting an ignition-on event, etc. In one embodiment, call center 20 establishes an alert trigger associated with a subscriber account held by the user. This approach may be used, for example, in the case that the user initiated the alert service via webpage 116 or via a call to the call center 20. In this case, call center 20 sends the alert trigger to telematics unit 30 in vehicle 12 associated with the user (e.g., based on information from the user's subscriber account) in order to setup, turn on, or otherwise enable the trigger inside the vehicle. As noted above, other embodiments are also possible, for instance, when using the phone app to initiate service, the command to establish device alert trigger may be sent from phone 22 to telematics unit 30 via a Bluetooth™ or a cellular connection. In another embodiment, the device alert trigger may be set in the vehicle based on selected option being inputted directly into vehicle via microphone 32 or otherwise.

Figure 3:
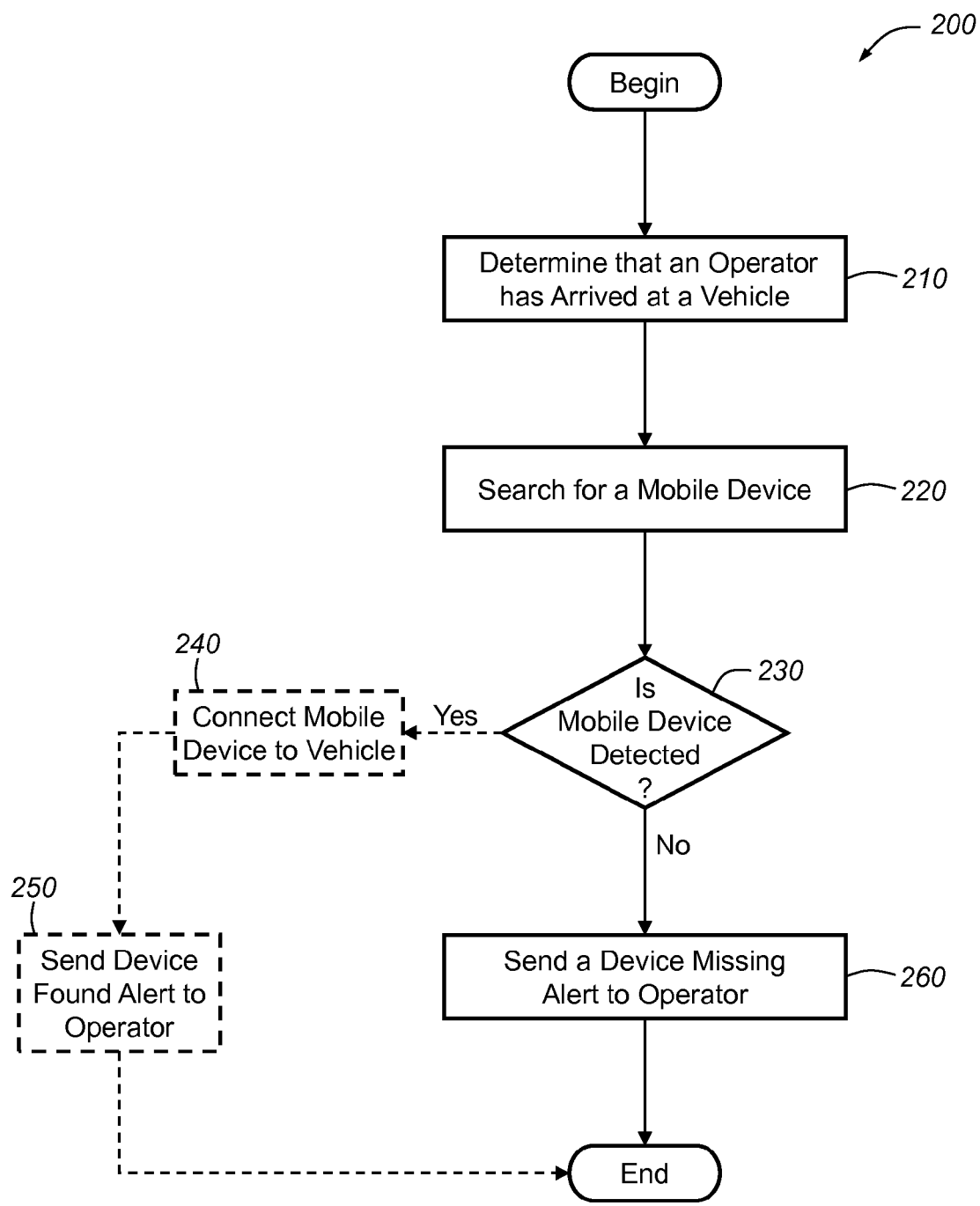
FIG. 3 is a flowchart of an exemplary embodiment of a method for providing a vehicle operator with a mobile device alert.

Referring now to FIG. 3, there is shown a method 200 of providing a mobile device alert for a vehicle operator who uses and at least occasionally carries on his or her person the mobile device 22. The method starts at step 210 and begins by detecting operation of the vehicle. This detection may be carried out by detecting occurrence of one or more events specified by the alert trigger. In some embodiments, the alert trigger conditions may be any one or more events that indicate that an operator has arrived at vehicle 12; that is, that an operator of the vehicle who was physically away from the vehicle (e.g., inside his or her house while the vehicle was parked outside or in the house's garage, place of business while the vehicle was parked in a parking lot, street parking, etc.) has now moved to within the general proximity of the vehicle (e.g., is either just outside the vehicle or has entered the vehicle). The operator arrival may be determined in any number of different ways; for example, by proximity detection of the operator or of some device (e.g., key fob, key, radio frequency identification tag, etc.) carried by the operator where, for example, VSM 42 receives an identifier associated with the device or operator. Such devices include vehicle access devices (e.g., key, key fob, keyless remote, ID tag, etc.) used to permit the operator to operate and/or otherwise access the vehicle. In another embodiment, detecting operation of the vehicle may involve detecting operation of a vehicle function including door unlock or a door opening which signals an operator arrival. Means for detecting door openings are known; for example, door handle detection switches are known in the art. In another embodiment, the alert trigger may monitor for an ignition-on event such turning the ignition on via a key or a push button which signals the arrival or presence of an operator at the vehicle. Other embodiments are also possible including weight sensor located inside the seat, a pedal sensor, or a steering wheel sensor that sends a signal to VSM 42 informing it about the presence of an operator. Other embodiments may use transmission setting or change (e.g., shifting the vehicle into drive) or sensed movement of the vehicle via a speed sensor, changing GPS coordinates, etc. In some embodiments, two or more sensed events may be combined and required for occurrence of the alert trigger, such as detecting both ignition-on and a transmission change from park or reverse into drive.

Once method 200 detects operation of the vehicle (e.g., by determining that an operator has arrived at vehicle 12) then method 200 proceeds to step 220 where it searches for a mobile device. In one embodiment, method 200 carries out a discovery process using short range wireless communication at the vehicle 12. In this case, the discovery process determines whether one or more mobile devices are present by monitoring for communication using the short range wireless communication. Any suitable short range wireless communication means may be used, for instance, using Bluetooth™ technology, there is a device discovery process by which telematics unit 30 receives identifying information (e.g., a device ID, device name, or other mobile device identifier) from mobile device 22 if it is present. In one exemplary embodiment, telematics unit 30 sends an inquiry signal and receives a response from mobile device 22. Telematics unit 30 may monitor the presence of such devices according to any of several options including continuously monitoring, predetermined time interval monitoring, up to certain number of mobile devices found, and/or other options.

After searching for a mobile device, method 200 proceeds to step 230 where method 200 determines if a mobile device is detected. At this step, method 200, in one embodiment, specifically determines if a mobile device identifier assigned to the mobile device associated with the operator of vehicle 12 is not detected. For instance, if no identifier (and therefore no mobile device) is detected then method 200 proceeds to step 260; however, if one or more wireless device identifiers are found then, at step 230, method 200 checks if any of the found device identifier(s) is the same as the device identifier assigned to the mobile device associated with the operator of vehicle 12. In one embodiment, processing device 52 retrieves one or more device identifiers assigned to mobile device 22 and stored at memory 54 and then processing device 52 compares one or more found device identifiers to the retrieved identifier(s). If processing device 52 find a match then method 200 may optionally carry out step 240, step 250, or both; otherwise, method 200 ends. Skilled artisans should appreciate that a mobile device may not be detected for different reasons including the device is not present, the device is not turned on, or the device is malfunctioning, to list few examples.

If the mobile device is found, then step 240, method 100 optionally connects the mobile device to the vehicle. In one embodiment, an application software running in telematics unit 30 pairs telematics unit 30 to mobile device 22 via a Bluetooth™ connection (e.g., legacy pairing, secure simple pairing, etc.). Bluetooth™ technology is well known by skilled artisans and thus, a description of the technology is omitted here. Skilled artisans should also appreciate that a different vehicle module including VSM 42 may be paired to mobile device 22 via a Bluetooth™ connection. Other linking methods can be used including WIFI IEEE 802.11, and/or any other networking or communication methods. Once connected, the vehicle may be able to provide hands-free use of the mobile device, for example. Step 240 may be optional and in this case step 230 proceeds directly to step 250. In another embodiment, both steps 240 and 250 are omitted and method 200 ends at step 230 if the outcome of step 230 is positive.

At steps 250-260, method 200 presents an alert within the vehicle 12. Depending on the outcome of step 230, vehicle 12 may provide a corresponding alert. The device found alert in step 250 may include a device identifier, such as by announcing the device name as a part of the alert. Where the mobile device 22 is not detected and the process moves to step 260, an alert notification indicating that the operator mobile device was not found is presented in the vehicle either audibly, visibly, or both. In one embodiment, audio system 36 audibly announces a standard message such as "Operator Mobile Device Not Found," or announcing a more individualized message such the device name of the missing device. Optionally, as a part of either step 250 and/or step 260, the system may announce the device name of each discovered device that has been previously registered with the vehicle or announce the device name of each discovered device regardless of whether it has been registered with or previously detected by the vehicle. Skilled artisans should appreciate that this alert may remind the operator that mobile device 22 is not turned on or is missing.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing a mobile device alert in a vehicle, comprising the steps of:
   (a) detecting operation of a vehicle;
   (b) attempting detection of a mobile device associated with an operator of the vehicle in response to the detection in step (a);
   (c) determining that the attempted detection of the mobile device failed; and
   (d) in response to the determination in step (c), presenting an alert within the vehicle that the mobile device was not detected.

2. The method of claim 1, wherein step (a) further comprises detecting an ignition-on event.

3. The method of claim 1, wherein step (b) further comprises obtaining an identifier associated with the operator, using the identifier to access a mobile device identifier assigned to the mobile device, and attempting detection of the mobile device using the mobile device identifier.

4. The method of claim 3, wherein step (c) further comprises detecting one or more wireless devices at the vehicle, wherein all of the detected wireless devices have device identifiers that are different than the mobile device identifier associated with the mobile device.

5. The method of claim 3, wherein step (a) further comprises obtaining the identifier associated with the operator from a vehicle access device carried by the operator.

6. The method of claim 5, wherein the vehicle access device is a key fob.

7. The method of claim 1, wherein step (b) further comprises carrying out a discovery process using short range wireless communication at the vehicle, wherein the discovery process determines whether one or more mobile devices are present by monitoring for communication using the short range wireless communication.

8. The method of claim 1, further comprising, prior to step (a), the step of receiving an alert trigger at the vehicle instructing the vehicle to carry out steps (a)-(d).

9. The method of claim 1, wherein step (d) further comprises presenting an alert notification in the vehicle that is audible, visible, or both.

10. The method of claim 9, wherein step (d) further comprises including in the alert notification a device name associated with the mobile device.

11. The method of claim 10, wherein step (d) further comprises audibly announcing a device name associated with other wireless devices, if any, that are detected in the vehicle.

12. A method of configuring a mobile device alert in a vehicle, comprising the steps of:
   (a) providing a graphical user interface that provides a user-selectable option to initiate an alert service for a mobile device held by the user;
   (b) receiving an indication that a user has selected the option;
   (c) establishing an alert trigger associated with the mobile device; and
   (d) configuring a vehicle with the alert trigger.

13. The method of claim 12, further comprising the step of providing the user with a confirmation that the alert trigger has been set in the vehicle.

14. The method of claim 12, wherein the mobile device is a mobile phone.

15. The method of claim 12, wherein step (c) further comprises the step of establishing an alert trigger that occurs on or after an ignition-on event for the vehicle.

16. A telematics unit for a vehicle for providing a mobile device alert in a vehicle, wherein the vehicle telematics unit includes a processor and computer readable memory that contains instructions that are executed by the processor to carry out the following steps:
   (a) detecting operation of a vehicle;
   (b) attempting detection of a mobile device associated with an operator of the vehicle in response to the detection in step (a);
   (c) determining that the attempted detection of the mobile device failed; and
   (d) in response to the determination in step (c), presenting an alert within the vehicle that the mobile device was not detected.

17. The telematics unit of claim 16, wherein the vehicle telematics unit includes a wireless cellular chipset for wireless communication to and from the vehicle, and includes circuitry that establishes a short range wireless communication with the mobile device such that the detection of the mobile device is determined by the telematics unit using the short range wireless-communication.

18. A telematics unit for a vehicle for providing a mobile device alert in a vehicle, wherein the vehicle telematics unit includes a processor and computer readable memory that contains instructions that are executed by the processor to carry out the following steps:
   (a) detecting operation of a vehicle;
   (b) attempting detection of a mobile device associated with an operator of the vehicle in response to the detection in step (a);
   (c) when determining that the attempted detection succeeded, presenting an alert within the vehicle that the mobile device was detected; and
   (d) when determining that the attempted detection failed, presenting an alert within the vehicle that the mobile device was not detected.

* * * * *